UNITED STATES PATENT OFFICE.

PHILIP McG. SHUEY, OF SAVANNAH, GEORGIA, ASSIGNOR OF ONE-FOURTH TO SAVANNAH CHEMICAL COMPANY, A CORPORATION OF GEORGIA, AND ONE-FOURTH TO F. I. GIBSON, OF SAVANNAH, GEORGIA.

PROCESS AND PRODUCT OF MAKING FERTILIZER MATERIAL.

1,341,598.

Specification of Letters Patent.

Patented May 25, 1920.

No Drawing. Application filed November 2, 1918. Serial No. 260,906.

*To all whom it may concern:*

Be it known that I, PHILIP McGREGOR SHUEY, a citizen of the United States, residing at Savannah, in the county of Chatham and State of Georgia, have invented certain new and useful Improvements in Processes and Products of Making Fertilizer Material, of which the following is a specification.

This invention relates to the manufacture of material for use as or in fertilizer, and it pertains particularly to the conversion of insoluble phosphate, contained in the various phosphate-bearing materials commonly used in the manufacture of fertilizer and fertilizer ingredients, such as phosphate rock, phosphorites, bones, etc., to forms in which they are available to plant life, by the use of niter-cake produced as a by-product of the manufacture of nitric and sulfuric acids, which contain principally sodium acid sulfate and also free sulfuric acid, and at the same time incorporating organic nitrogenous material into the mass.

While the invention contemplates the use of any organic nitrogenous material economically suitable for fertilizer purposes, one such material that it takes and renders available as a fertilizer ingredient is "liquid stick" or "stick" as commonly known in the trade, which in its ordinary condition is not conveniently available.

Stick, as commonly known, is a material obtained from slaughter-houses and other places, and it is produced, among other ways, in the manufacture of slaughter-house tankage, in which entrails and other waste animal parts are rendered by cooking and evaporating down, after which the mass is put into a press. The liquid portion pressed out is heated and evaporated down until it is thick and viscous. The product thus obtained is commonly known as "stick." Stick also is produced as a result of the compression of fish in the manufacture of fertilizer, oil, etc., oil being treated to produce what is separated from the liquid pressed out and the matter remaining being known as "fish stick."

Owing to its high nitrogenous content, stick would be valuable as a fertilizer ingredient. However, it usually is semi-liquid and viscous, and being very gummy it is impracticable to use it in that condition as or in fertilizer.

It is an object of the invention to place stick in a workable condition and at the same time to provide a material that contains other valuable fertilizer substances.

The process provided by the invention includes the mixing of niter-cake in a molten state with ground phosphate-bearing material and organic nitrogenous material, such as stick, the sodium acid sulfate and free acid of the niter-cake converting the insoluble tricalcium phosphate of the phosphate material into soluble mono and di calcium forms.

Inasmuch as niter-cake is in a molten condition at the time it is withdrawn from the niter pots or retorts in which it has been produced as a by-product, the process of this invention can be carried out economically in association with that in which the niter-cake is formed, as that material can be transferred directly from the pots or retorts to an apparatus in which it is mixed with other materials, and thus the necessity of heating the niter-cake may be avoided.

When molten niter-cake is mixed quickly with ground phosphate-bearing material and stick, the heat of the niter-cake and that generated by chemical action is such as to allow the mass to remain sufficiently liquid or plastic for the time required for it to be mixed thoroughly and dumped before solidification takes place.

The process provided by the invention may be carried out, for example, conveniently as follows: Molten niter-cake is run, preferably directly from the pots or retorts, into a suitable mixer, and ground phosphate-bearing material and stick are introduced at the same time. The proportions of niter-cake and phosphate-bearing material are dependent upon the estimated acidity of the one material and the estimated insoluble content of the other that it is desired to convert, it being desirable to use sufficient niter-cake to convert practically all of the phosphate from the insoluble to the soluble forms. With the usual run of phosphate material containing approximately seventy per cent. bone phosphate of lime or its equivalent, approximately one part by weight of that material is used to two parts by weight of niter-cake, and usually one part by weight of stick is the proper proportion of that material for fertilizer purposes.

The materials are mixed for about three minutes, or until they are commingled thoroughly, and the mixing is discontinued and the mass removed from the mixer before it has cooled and solidified to such an extent as to have a tendency to clog the apparatus and become difficult of removal. The heat of the molten niter-cake and that generated by chemical action is sufficient to keep the mass liquid long enough to permit thorough mixing. The gases resulting from chemical reaction are liberated through a vent in the top of the mixer to any desired place of disposal in any suitable manner.

While the mass is in a liquid state in the mixer and thereafter until cooling, practically eighty-seven per cent. or more of the insoluble tricalcium phosphate is converted to mono-calcium phosphate and di-calcium phosphate. It has been found in practice that the stick does not interfere with the chemical action between the niter-cake and the phosphate-bearing material.

The liquid condition of the mass accelerates and makes more thorough the chemical action, for, the acid salt being in a molten condition and coming into intimate contact with the phosphate-bearing material, it acts on the salt of that material in practically the same manner as free acid.

The stick is hardened on being mixed with the other materials mentioned, and at the same time the stick has a softening effect on the mass, which on completion of the process is in a workable condition for use as or in fertilizer. By being placed in a workable condition the value of the nitrogen in the stick is increased to the extent of approximately forty per cent.

On cooling, the mass is available for disintegration at once for use as or in fertilizer. However, it is preferable to allow the mass to age, inasmuch as on standing it takes up moisture and thereby allows the remaining free acid and that which may be liberated during aging, to act upon the remaining unconverted phosphate and cause conversion of a considerable part of it to soluble forms. It has been found that a mass that has aged for ten days has about ninety per cent. of its phosphate in available form, which is about the proportion of availability that is found in acid phosphate properly made by the methods heretofore employed.

The mass will contain approximately seven per cent. of available phosphoric acid, nitrogen equivalent to two and one-half per cent. of ammonia, and approximately one-half of one per cent. of potash, the latter being derived from both the stick and niter-cake.

None of the nitrogenous content of the stick, which runs in equivalent of ammonia from nine to twelve per cent., is lost as a result of the subjection of that material to heat during mixing.

Having thus described my invention, what I claim as new, and desire to secure by Letters Patent, is—

1. In the manufacture of fertilizer material, the mixing of molten niter-cake, phosphate-bearing material, and organic nitrogenous material.

2. In the manufacture of fertilizer material, the mixing of molten niter-cake, ground phosphate-bearing material, and organic nitrogenous material.

3. The process of making fertilizer material that includes the introduction of molten niter-cake, organic nitrogenous material, and ground phosphate-bearing material into a mixer, mixing the materials therein, and discharging the mass therefrom before solidification.

4. The process of making fertilizer material that includes the introduction of molten niter-cake, organic nitrogenous material, and ground phosphate-bearing material into a mixer, mixing the materials therein, discharging the mass therefrom before solidification, and permitting the mass to age.

5. In the manufacture of fertilizer material, the mixing of molten niter-cake, phosphate-bearing material, and stick.

6. In the manufacture of fertilizer material, the mixing of molten niter-cake, ground phosphate-bearing material, and stick.

7. The process of making fertilizer material that includes the introduction of molten niter-cake, stick, and ground phosphate-bearing material into a mixer, mixing the materials therein, and discharging the mass therefrom before solidification.

8. The process of making fertilizer material that includes the introduction of molten niter-cake, stick, and phosphate-bearing material into a mixer, mixing the materials therein, discharging the mass therefrom before solidification, and permitting the mass to age.

9. In the manufacture of fertilizer material, the mixing of ingredients in proportions substantially as follows: two parts of molten niter-cake, one part of phosphate-bearing material, and one part of organic nitrogenous material.

10. In the manufacture of fertilizer material, the mixing of ingredients in proportions substantially as follows: two parts of molten niter-cake, one part of phosphate-bearing material, and one part of stick.

11. Fertilizer material produced by the mixing of molten niter-cake, phosphate bearing material, and organic nitrogenous material.

12. Fertilizer material produced by the mixing of molten niter-cake, phosphate-bearing material, and stick.

13. In the manufacture of fertilizer material, the mixing, in the absence of moisture other than that inherent to the ingredients, of phosphate-bearing material, an organic nitrogenous material, and hot niter-cake.

14. The process of making fertilizer material that includes the introduction of organic nitrogenous material, ground phosphate-bearing material, and hot niter-cake into a mixer, mixing the materials therein in the absence of moisture other than that inherent to the ingredients, and discharging the mass therefrom before solidification.

15. The process of making fertilizer material that includes the introduction of stick, dry hot niter-cake, and dry phosphate-bearing material into a mixer, mixing the materials therein, and discharging the mass therefrom before solidification.

16. In the manufacture of fertilizer material, the mixing of ingredients in proportions substantially as follows: two parts of dry hot niter-cake, one part of dry phosphate-bearing material, and one part of organic nitrogenous material.

17. In the manufacture of fertilizer material, the mixing of ingredients in proportions substantially as follows: two parts of dry hot niter-cake, one part of dry phosphate-bearing material, and one part of stick.

18. Fertilizer material produced by the mixing of dry hot niter-cake, dry phosphate-bearing material, and organic nitrogenous material.

19. Fertilizer material produced by the mixing of dry hot niter-cake, dry phosphate-bearing material, and stick.

20. In the manufacture of fertilizer material, the mixing, in the absence of water other than that inherent to the ingredients, of phosphate-bearing material, stick, and hot niter-cake.

In testimony whereof I affix my signature.

PHILIP McG. SHUEY.

Witness:
C. H. DAVIS.